Patented Nov. 26, 1935

2,022,240

UNITED STATES PATENT OFFICE 2,022,240

HALOGENATED VAT DYESTUFF OF THE BENZANTHRONYLAMINOANTHRAQUINONE SERIES AND PROCESS OF MAKING SAME

Ernst Honold and Rudolf Müller, Frankfort-on-the-Main-Fechenheim, Germany, assignors to General Aniline Works, Inc., New York, N. Y., a corporation of Delaware No Drawing. Application May 8, 1934, Serial No. 724,612. In Germany May 10, 1933

4 Claims. (Cl. 260—36)

Our invention relates to new halogenated vat dyestuffs and process of making same.

If the vat dyestuffs of the general formula

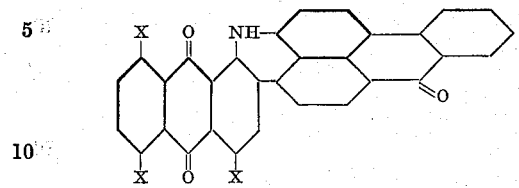

wherein the X's mean hydrogen or one X means an acylamino-group and the other X's mean hydrogen, which dyestuffs are described in U. S. Patents 995,936 and 1,850,562 and 1,877,947, are treated according to the usual methods with a halogen or a halogenating agent, in varying yields, often together with considerable quantities of decomposition products, mixtures of di- to tetrahalogenated derivatives are obtained, which, it is true, are useful as intermediates for further conversion reactions, but themselves only dye the fiber dull shades of no practical interest.

In accordance with our present invention it is possible in a surprising manner to obtain low chlorinated derivatives of the said starting materials of great tinctorial value, which are entirely free from decomposition products. These products are obtained either by treating the said initial products with a chlorinating agent under such mild conditions as are not customary for the halogenation of vat dyestuffs. In a remarkable manner by merely acting with benzol chloride the valuable dichloroderivative is formed. When the customary stronger chlorinating agents are employed in order to stop the chlorination process at the stage corresponding to the low chlorinated derivatives, it must be carried out under particularly mild conditions as regards temperature, quantity of agent, which should advisably not essentially exceed the theoretical amount, and duration of reaction. The reaction may be carried out with or without the addition of a diluent and a suitable catalyst.

In accordance with another feature of our invention the higher chlorinated products which are mostly chlorine addition products and therefore constitute derivatives of the hydrogenated dyestuffs, can be converted by treatment with dehalogenating agents or with agents which cause a splitting off of hydrochloric acid into dyestuffs which still contain chlorine and are practically equivalent to the dyestuffs obtained by the aforesaid direct chlorination under mild conditions.

The highly chlorinated products are advantageously prepared by chlorinating the said initial products by means of chlorine or a chlorinating agent in the presence of an organic solvent or suspending agent. In most cases seven or more chlorine atoms can be introduced into the molecule by this means.

The present dehalogenation process or process of splitting off hydrochloric acid may be carried out advantageously by the application of the usual agents such as sodium sulfide, formic acid, sulfuric acid, hydrazine, hydroquinone or the like, or also by a simple heating of the highly chlorinated starting materials to elevated temperatures with or without the addition of a diluent. A partial splitting off of chlorine atoms or of hydrochloric acid is effected by dissolving in concentrated sulfuric acid and precipitating by pouring the solution into ice-water. By subsequently dissolving the finely divided products thus obtained in a sufficient quantity of hydrosulfite and alkali a further splitting off takes place so that the dehalogenation process of the present invention may be combined with the fixation of the final products on the fiber.

The products obtained according to the above described processes correspond with the general formula

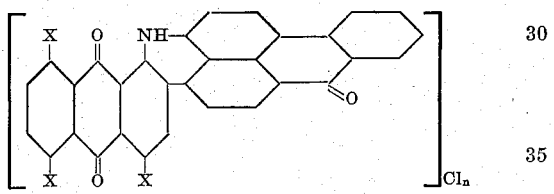

wherein the X's mean hydrogen or one X means an acylamino-group and the other X's mean hydrogen, $n$ is approximately the number 2. The new dyestuffs dye the fiber bluish green shades which in comparison with the shades of the initial products are superior as regards purity, bluish tint and fastness to chlorine (particularly in the form of chloride of lime).

In order to further illustrate our invention the following examples are given, the parts being by weight and all temperatures in centigrade degrees; but we wish it to be understood that our invention is not limited to the examples given, nor to the exact conditions stated therein.

*Example 1*

50 parts of the condensation product obtained by acting with an alkaline condensing agent on benzanthronyl-1-amino-anthraquinone and described in U. S. Patent 995,936 in a finely divided form are added to a mixture of 100 parts of benzoyl chloride and 500 parts of nitrobenzene and the whole mixture is maintained for a comparatively long time at about 200°. When cool the precipitate formed is filtered off, washed with nitrobenzene, which is removed in the usual manner and dried. The new product contains about 13.5 to 14% of chlorine which corresponds to the entrance of about 2 chlorine atoms into the molecule. The new product of the formula

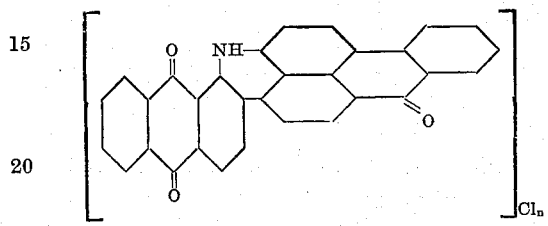

wherein $n$ is approximately the number 2, dissolves in concentrated sulfuric acid with a green coloration. It forms with an alkaline hydrosulfite solution a dark bluish violet vat and dyes cotton therefrom fast bluish green shades which are substantially brighter, more bluish and faster to chlorine than the dyeings obtained with the initial material.

*Example 2*

100 parts of the same starting material as used in Example 1 are finely powdered and successively while slightly cooling at 10° to 25° poured into about 500 parts of sulfurylchloride with the addition of about 1 part of iodine. After some hours the evolution of hydrochloric acid ceases. Then ice is added to the reaction mass whereby the excess of sulfurylchloride is decomposed. The formed chlorinated dyestuff is filtered off, advantageously extracted with a warm diluted caustic alkali solution, filtered off again, washed out and dried. It is practically identical with the product of Example 1 as to its tinctorial and other properties.

*Example 3*

30 parts of the initial product of Examples 1 and 2 are mixed with about 300 parts of nitrobenzene and at 20° to 30° 20 parts of sulfurylchloride are added. Then the reaction mass is heated at about 100° during 1 to 2 hours in an apparatus provided with a reflux condenser, then the temperature is increased during further 1 to 2 hours to about 200° and kept during some hours. When cool the separated dyestuff is filtered off and dried. It corresponds in its properties with the dyestuffs of the foregoing examples.

*Example 4*

20 parts of the dyestuff described in Example 1 of U. S. Patent 1,850,562 and obtained by acting with benzoyl chloride on the alkaline condensation product of bz-1-benzanthronyl-1-amino-5-amino-anthraquinone, are suspended in about 200 parts of nitrobenzene and while stirring 15 parts of sulfurylchloride are slowly added. During about 6 hours the mixture is heated at elevated temperatures, finally at 200°. The reaction product is isolated in the usual manner. It contains 11% of chlorine corresponding to two chlorine atoms in the molecule and corresponds with the formula

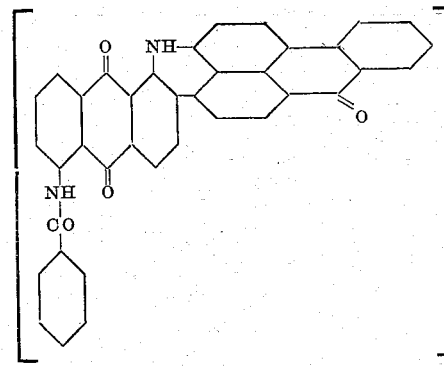

wherein $n$ is approximately the number 2. The dyestuff dissolves in concentrated sulfuric acid with a green color. It dyes cotton from a blue vat clear olive shades of a good fastness. In comparison with the starting material the dyestuff dyes more bluish shades of an improved fastness to the action of strong agents providing chlorine.

*Example 5*

20 parts of the dyestuff, obtained by acetylating the alkaline condensation product of bz-1-benzanthronyl-1-amino-5-amino-anthraquinone and described in Example 4 of U. S. Patent 1,850,562, are suspended in about 200 parts of o-chlorotoluene and treated with 12 parts of sulfurylchloride as described in Example 4. The chlorinated dyestuff of the formula

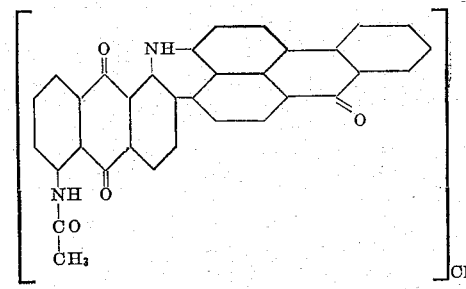

wherein $n$ is approximtely the number 2, dyes cotton from a blue vat bluish olive-green shades. It dyes essentialy more bluish shades than the initial dyestuff.

Instead of the cited diluents others such as tetrachloroethane may be used or the action of sulfurylchloride may be carried out at lower temperatures without the addition of a diluent.

The acylation of the alkaline condensation product of bz-1-benzanthronyl-1-amino-5-amino-anthraquinone as described in U. S. Patent 1,850,562 can be combined with the present halogenation in a single operation, advantageously in the presence of an organic diluent such as nitrobenzene.

*Example 6*

20 parts of the highly chlorinated product obtained by introducing chlorine at about 40° to 50° while stirring into a suspension of the alkaline condensation product of benzanthronyl-1-amino-anthraquinone in about ten times the quantity of nitrobenzene, which product contains 34 to 35% of chlorine and yields only a faint olive dyeing on cotton, are boiled for some hours while stirring with the addition of a solution of 60 parts of sodium sulfide in about 250 parts of water. The reaction product which is isolated in the usual manner contains according to analysis only about 2 chlorine atoms in the molecule and is distinguished in comparison with the starting material by a bright bluish shade and an increased fastness to chlorine. It corresponds in its tinctorial and other properties with the dyestuffs of Examples 1 to 3.

*Example 7*

20 parts of the highly chlorinated initial product used in the foregoing Example 6 are dissolved at room temperature in about 200 parts of concentrated sulfuric acid whereby already hydrochloric acid gas is evolved. When the solution is complete the mass is poured on ice and the precipitate is filtered off and washed out until a neutral reaction. The paste thus obtained yields with an alkaline hydrosulfite solution a vat from which the dyestuff dyes the fiber the same shades as described in the foregoing Example 6.

Very similar products are obtained when heating the same initial product for a short time with the addition of a diluent such as nitrobenzene or when treating it with hydrazine or hydrosulfite with the addition of glacial acetic acid.

*Example 8*

20 parts of a chlorination product obtained by the action of an excess of sulfurylchloride at about 90° on the alkaline condensation product of benzanthronyl-1-amino-anthraquinone are mixed with a solution of 10 parts of hydrazine-hydrate in about 200 parts of glacial acetic acid and the mixture is boiled for about an hour. The precipitated dye-stuff is filtered off while hot, washed out and dried. It is very similar to the dyestuffs of Examples 6 and 7. The process of dehalogenation may be likewise carried out by boiling the initial product with 30 parts of hydrosulfite in the presence of glacial acetic acid.

*Example 9*

Into a suspension of 50 parts of the dyestuff obtained by acting with benzoylchloride on the alkaline condensation product of bz-1-benzanthronyl-1-amino-5-amino-anthraquinone (cf. Example 1 of U. S. Patent 1,850,562) in about 500 parts of tetrachlorethane, while stirring but without cooling, chlorine is introduced. While warming at about 50° to 60° by itself the dyestuff dissolves with a brown color. Then the solvent is removed by a steam distillation. The residue represents a highly chlorinated addition product containing more than 40% of chlorine. When finely divided it forms a blue alkaline hydrosulfite vat. The shade of dyeings thereof is surprisingly nearly the same as obtained by means of the dyestuff of Example 4. By vatting the dehalogenation has occurred already. The dehalogenation process may be carried out likewise by boiling with an aqueous sodium sulfide solution, hydrazine or hydrosulfite in the presence of glacial acetic acid or by treatment with formic acid.

We claim:—

1. Halogenated vat dyestuffs of the general formula

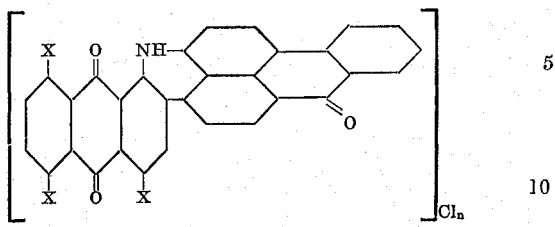

wherein the X's mean hydrogen or one X means an acyl-amino-group and the other X's mean hydrogen, $n$ is approximately the number 2, which dyestuffs dye the fiber bluish green shades of great purity and fastness to chlorine.

2. The halogenated vat dyestuff of the formula

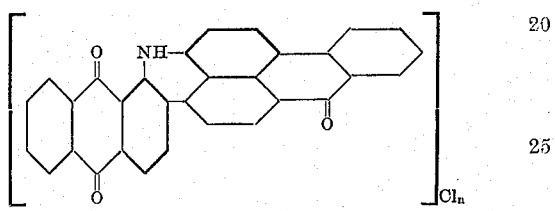

wherein $n$ is approximately the number 2, which dissolves in concentrated sulfuric acid with a green color and dyes cotton from a dark bluish violet hydrosulfite vat bluish green shades.

3. The halogenated vat dyestuff of the formula

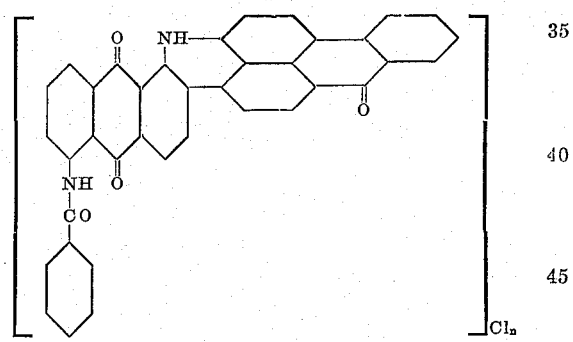

wherein $n$ is approximately the number 2, which dyestuff dissolves in concentrated sulfuric acid with a green color and dyes cotton from a blue vat clear olive shades of a good fastness.

4. The halogenated vat dyestuff of the formula

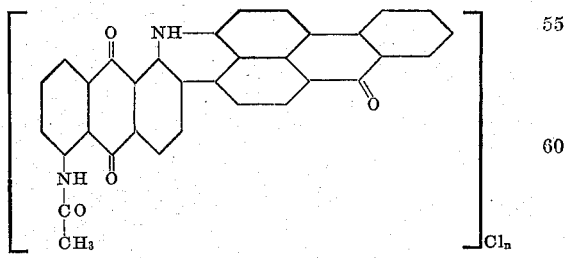

wherein $n$ is approximately the number 2, which dyestuff dyes cotton from a blue vat bluish olive-green shades.

ERNST HONOLD.
RUDOLF MÜLLER.